United States Patent
Franks, Sr.

(10) Patent No.: US 10,907,302 B2
(45) Date of Patent: Feb. 2, 2021

(54) ROOFING PRODUCT INCLUDING ROOFING-GRADE ASPHALT MIXTURE AND METHODS OF MAKING THE ROOFING PRODUCT AND THE ROOFING-GRADE ASPHALT MIXTURE

(75) Inventor: Michael J. Franks, Sr., Collegeville, PA (US)

(73) Assignee: CERTAINTEED CORPORATION, Malvern, PA (US)

( * ) Notice: Subject to any disclaimer, the term of this patent is extended or adjusted under 35 U.S.C. 154(b) by 796 days.

(21) Appl. No.: 13/541,328

(22) Filed: Jul. 3, 2012

(65) Prior Publication Data
US 2013/0022823 A1    Jan. 24, 2013

Related U.S. Application Data

(60) Provisional application No. 61/510,571, filed on Jul. 22, 2011.

(51) Int. Cl.
*C08L 95/00* (2006.01)
*D06N 5/00* (2006.01)
(Continued)

(52) U.S. Cl.
CPC .............. *D06N 5/003* (2013.01); *B32B 11/10* (2013.01); *C08K 3/24* (2013.01); *C08L 95/00* (2013.01);
(Continued)

(58) Field of Classification Search
None
See application file for complete search history.

(56) References Cited

U.S. PATENT DOCUMENTS 4,055,453 A * 10/1977 Tajima ................... B32B 11/04
156/279
5,494,728 A * 2/1996 Vermilion et al. ............ 428/143
(Continued)

FOREIGN PATENT DOCUMENTS

GB        208770        12/1923
GB        483907        4/1938

OTHER PUBLICATIONS

Hawleys Jojoba oil(2008).*
(Continued)

*Primary Examiner* — Kenneth J Stachel
(74) *Attorney, Agent, or Firm* — Abel Schillinger, LLP; Thomas H Osborn (57) ABSTRACT

A method of forming a roofing-grade asphalt mixture can include mixing a bio-asphalt including a partially oxidized bio-source material, a bitumen source material different from the bio-asphalt, and particles to form the roofing-grade asphalt mixture. In an embodiment, the bitumen source material can have a softening point of at least approximately 102° C. and a penetration distance no greater than approximately 20 dmm. In another embodiment, the roofing-grade asphalt mixture can have a softening point of at least approximately 104° C., a penetration distance no greater than approximately 12 dmm, a viscosity of at least approximately 3000 cps at a temperature of 177° C., or any combination thereof. The roofing-grade asphalt mixture can be applied to a base material to form a roofing product.

10 Claims, 2 Drawing Sheets

(51) Int. Cl.
*B32B 11/10* (2006.01)
*C08K 3/24* (2006.01)
*C08L 91/00* (2006.01)

(52) U.S. Cl.
CPC ........... *B32B 2419/06* (2013.01); *C08L 91/00* (2013.01); *C08L 2555/34* (2013.01); *C08L 2555/40* (2013.01); *C08L 2555/52* (2013.01); *C08L 2555/64* (2013.01); *Y10T 428/31641* (2015.04); *Y10T 428/31815* (2015.04); *Y10T 428/31819* (2015.04)

(56) References Cited

U.S. PATENT DOCUMENTS

| | | | |
|---|---|---|---|
| 6,869,981 B2 | 3/2005 | Fewkes et al. | |
| 7,241,500 B2 | 7/2007 | Shiao et al. | |
| 7,951,417 B1 | 5/2011 | Wen et al. | |
| 7,951,862 B2 | 5/2011 | Bloom et al. | |
| 2002/0026884 A1* | 3/2002 | Raad | 106/244 |
| 2003/0212168 A1* | 11/2003 | White | C08L 95/00 524/59 |
| 2004/0260057 A1 | 12/2004 | Michel | |
| 2005/0072110 A1 | 4/2005 | Shiao et al. | |
| 2007/0151480 A1* | 7/2007 | Bloom et al. | 106/220 |
| 2008/0006178 A1 | 1/2008 | Michel | |
| 2008/0119591 A1* | 5/2008 | Falkiewicz et al. | 524/68 |
| 2008/0220167 A1 | 9/2008 | Wisniewski et al. | |
| 2008/0245269 A1* | 10/2008 | Forth | C04B 26/003 106/244 |
| 2009/0000514 A1* | 1/2009 | Trumbore | C08L 95/00 106/270 |
| 2009/0053270 A1* | 2/2009 | Yoshida | A61K 8/8147 424/401 |
| 2010/0034586 A1 | 2/2010 | Bailey et al. | |
| 2011/0259239 A1* | 10/2011 | Wen et al. | 106/246 |

OTHER PUBLICATIONS

United Environment & Engergy, LLC "Technoligies—Bioasphalt" 4 pages (accessed Mar. 10, 2011).
Nano Patents and Innovations "Smart Shingle Coating Made From Fast Food Waste Oil Can Automatically Adjust Reflective and Transmitive Qualities with Temperature Changes" 3 pages (Mar. 21, 2010).
Jessica Bosari "Scientific Discovery Turns Discarded Cooking Oil Into Enegery Savings" 2 pages (Jul. 2010).
Above All Roofing Solutions Blog "New Roof Coating System" 2 pages (Apr. 19, 2010).
Above All Roofing Solutions Blog "Things to know when replacing a roof" 1 page (Jun. 7, 2010).
WSU Today "Researchers work to develop earth- friendly asphalt" 2 pages (Apr. 27, 2010).
Recovery.gov website "Project Summary" 3 pages (2010).
Innovations Development Institute "Waste Cooking Oil and Fly Ash Based Bioasphalt" 2 pages (2009).

* cited by examiner

ROOFING PRODUCT INCLUDING ROOFING-GRADE ASPHALT MIXTURE AND METHODS OF MAKING THE ROOFING PRODUCT AND THE ROOFING-GRADE ASPHALT MIXTURE

RELATED APPLICATION

This application is a continuation of and claims priority under 35 U.S.C. § 120 to U.S. Patent Application No. 61/510,571 entitled "Roofing Product Including Roofing-Grade Asphalt Mixture and Methods of Making the Roofing Product and the Roofing-Grade Asphalt Mixture" by Franks filed Jul. 22, 2011, which is assigned to the current assignee hereof and incorporated herein by reference in its entirety.

FIELD OF THE DISCLOSURE

The present disclosure relates to roofing products and methods of making the roofing products and roofing-grade asphalt mixtures.

RELATED ART

Roofing products can be in different forms, such as shingles or membranes. The roofing products can include a base material and a bituminous material. The base material can include wood, a wood derivative (e.g., paper), fiberglass, organic fibers (e.g., polyester), or the like. Conventionally, the bituminous material can include asphalt, a filler, and potentially a plasticizer. A variety of fillers has been used including limestone, talc, fly ash, coal fines, or other relatively inert materials. Limestone has been most commonly used as filler in roofing products due to its relatively low cost and its compatibility with a wide variety of materials used for roofing products. Regardless of the composition of a roofing product, the roofing product must still be able to withstand the rigors of shipping and handling, installation, and exposure to outdoor environments for many years.

BRIEF DESCRIPTION OF THE DRAWINGS

Embodiments are illustrated by way of example and are not limited in the accompanying figures.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

Before addressing details of embodiments described below, some terms are defined or clarified. The term "abrasive particle" is intended to mean a particle having a hardness at least as hard as a ceramic base material used or to be used within the same roofing product.

The term "perimeter volume" is intended to mean a volume generally defined by outer surfaces of an object. For example, a fiberglass mat can include glass fibers in the form of an open structure. The outer surfaces of the fiberglass mat are used to determine the perimeter volume. The volume occupied by only the glass fibers within the fiberglass mat may be substantially less than the perimeter volume.

The term "principal surfaces," with respect to a roofing article or product, is intended to mean a pair of opposite surfaces of such roofing article or product, wherein one of the surfaces lies or would lie farther from a structure to which the roofing article or product is installed or intended to be installed, and the other surface of such roofing article or article lies or would lie closer to a structure to which the roofing article or article is installed or intended to be installed. When installed, the principal surface farther from the structure may be directly exposed to an outdoor environment, and the other principal surface may contact the structure or a different roofing product that lies between the other principal surface and the structure.

As used herein, the terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the roofing product arts and corresponding manufacturing arts.

A roofing-grade asphalt mixture can include a bio-asphalt, another bitumen source material, and particles. In embodiments as described herein, the bio-asphalt in the roofing-grade asphalt mixture may allow use of the other bitumen source material that may otherwise not be used in making roofing-grade asphalt. In a particular embodiment, the other bitumen source material has a softening point of at least approximately 102° C. and a penetration distance (100 g at 25° C., ASTM D5) no greater than approximately 30 dmm. The other bitumen source material may be a petroleum-based asphalt, coal tar, or the like. The bio-asphalt can be a partially oxidized bio-source material, such as a bio-oil, whether new or used (recycled), or any combination thereof. In a particular embodiment, the bio-asphalt includes a partially oxidized recycled vegetable oil. The bio-asphalt may include particles, such as limestone, talc, clay, coal fines, fly ash, gypsum, calcite, or any combination thereof, and may be added before or after the oxidation is performed. The oxidation of the bio-source material can be performed in the presence of a catalyst. In a particular embodiment, the catalyst for oxidation is provided in a solid form. In another particular embodiment, the catalyst for oxidation is provided in a liquid form. An exemplary catalyst is ferric chloride. Other suitable catalysts include metal driers such as metal carboxylates wherein the metal is selected from the group of cobalt, manganese, calcium, zirconium, cerium, zinc, vanadium iron, aluminum, strontium, barium, and lithium. Non-limiting examples of such driers include cobalt octoate, cobalt linolate, vanadium naphthenate, vanadium octoate, zirconium octoate, cobalt naphthenate, lithium neodecanoate, cobalt octoate in methyl soyate, manganese linoleate, and combinations thereof.

The roofing-grade asphalt can be applied to a base material during formation of a roofing product, such as a roofing shingle, a roofing membrane, another suitable roofing product that includes a roofing-grade asphalt, or the like. If needed or desired, roofing granules, a parting agent, an adhesive, a release sheet, or any combination thereof may be applied to a surface of the combination of base material and roofing-grade asphalt.

The combination of the bio-asphalt, the other bitumen source material, and the particles can form the roofing-grade asphalt mixture having a softening point of at least approximately 104° C. (220° F.), a penetration distance no greater than approximately 12 dmm, a viscosity of at least approximately 3000 cps at a temperature of 177° C. (350° F.), or any combination thereof. The roofing-grade asphalt mixture can be used to form a roofing product, such as a roofing shingle, a roofing membrane, or another suitable roofing product that includes a roofing-grade asphalt.

In embodiments as described herein, the use of bio-asphalt may allow an off-specification bitumen source material to be used and still form a roofing-grade asphalt mixture of acceptable quality. Further, the roofing-grade asphalt mixture can provide a more environmentally acceptable solution to conventional roofing-grade asphalt that includes a petroleum-based asphalt as a sole bitumen source material. The roofing-grade asphalt can use a renewable source that is less likely to be irreversibly depleted. Similarly, fluctuations in the supply of such bio-source materials may be less affected by political or other factors. Still further, the roofing-grade asphalt mixture can reduce the amount of spent bio-based materials that may otherwise need to be disposed of by less environmentally acceptable means.

Figure 1:
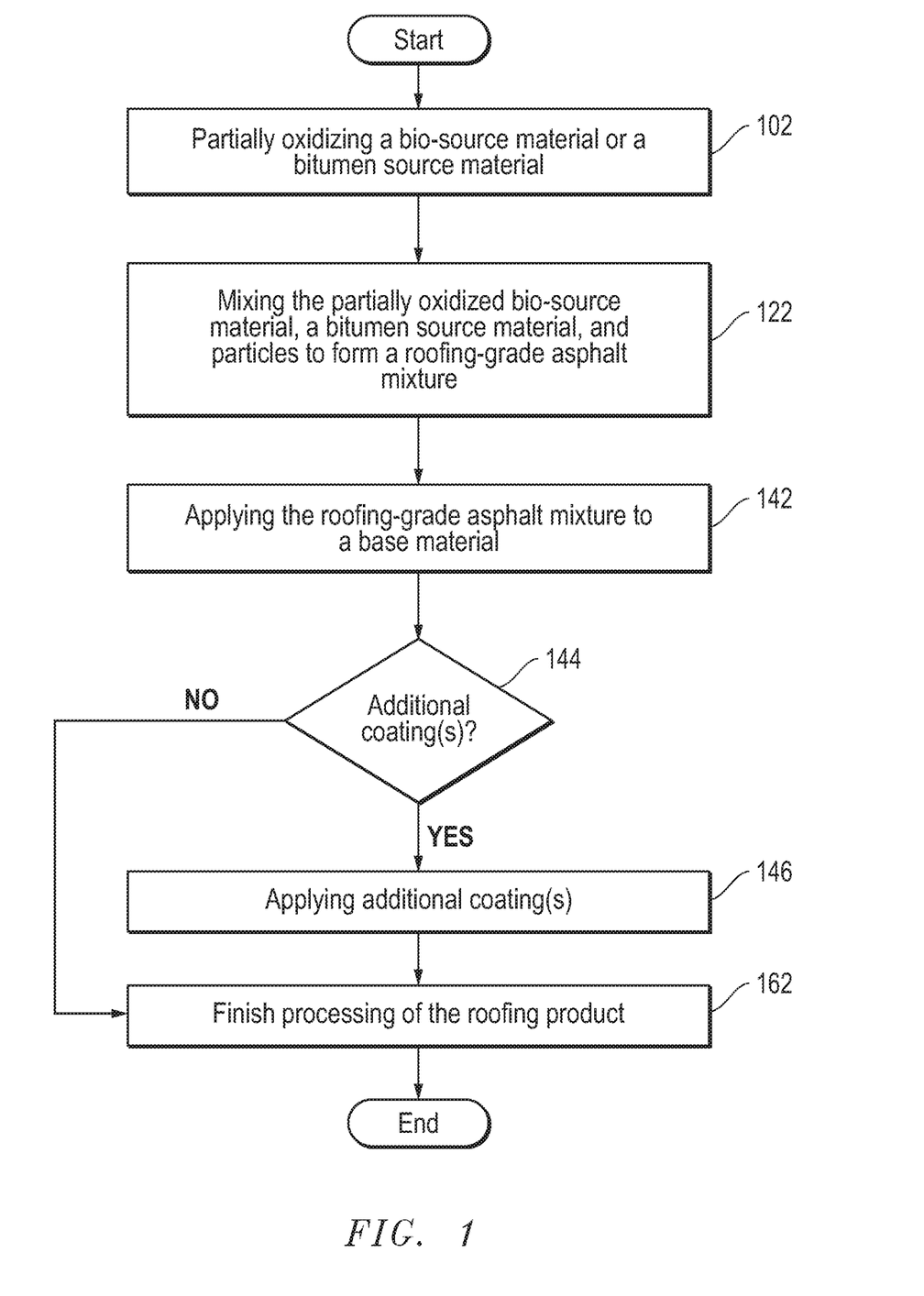
FIG. 1 includes a process flow diagram illustrating an exemplary method of forming a roofing product.

FIG. 1 includes a non-limiting, exemplary process flow that can be used to form a roofing product using a roofing-grade asphalt mixture that includes a bio-asphalt and a bitumen source material. The bio-asphalt has been previously described. The bitumen source material can be different from the bio-asphalt. Such a bitumen source material can include a petroleum-based bitumen, coal tar, or another suitable bitumen source material. Unlike the bio-asphalt, the bitumen source material may be a non-renewable bitumen source material, as it may take many years (for example, hundreds of years, thousands of years, or longer) to form the bitumen source material. For a bitumen source material that has a softening point that is too high and a penetration distance that is too low, such a bitumen source material may not be oxidized. In a particular embodiment, the bitumen source material can include one or more than one bitumen source material, wherein at least one of the other bitumen source materials that may have unsuitable characteristics for a roofing-grade asphalt.

In the embodiment of FIG. 1, the method includes partially oxidizing a bio-source material or a bitumen source material, at block 102. The bio-source material or the bitumen source material can be oxidized if needed or desired to achieve a desired softening point, penetration distance, viscosity, or other suitable characteristic. In an embodiment, the oxidation can be performed such that a combination of the bio-source material and the bitumen source material has a softening point of at least approximately 88° C. (190° F.), at least approximately 93° C. (200° F.), or at least approximately 104° C. (220° F.). In another embodiment, the oxidation can be performed such that the combination of the bio-asphalt and the bitumen source material has a softening point no greater than approximately 120° C. (248° F.), no greater than approximately 115° C. (239° F.), or no greater than 112° C. (234° F.). In yet another embodiment, the combination of the bio-asphalt and the bitumen source material can have a penetration distance of less than approximately 30 dmm, less than approximately 20 dmm, or less than approximately 15 dmm. In a further embodiment, the oxidation can be performed such that the viscosity of the combination of the bio-asphalt and bitumen source material, when measured at 177° C. (350° F.) is at least approximately 3500 cps, at least approximately 3700 cps, or at least approximately 3900 cps. In another further embodiment, the oxidation can be performed such that the viscosity of the bio-asphalt, when measured at 177° C. (350° F.) is at no greater than approximately 4500 cps, no greater than approximately 4400 cps, or no greater than approximately 4300 cps.

The oxidation may be performed using air, molecular oxygen (at a concentration different from air), ozone, or another suitable oxidizing gas at a time and temperature such that any needed or desired characteristic of the bio-source material or the bitumen source material (for example, softening point, penetration distance, viscosity, another suitable parameter, or any combination thereof) is achieved. In a particular embodiment, the oxidation may be performed at a temperature in a range of approximately 100° C. (212° F.) to approximately 235° C. (455° F.). The oxidation of the bio-source material can be performed in the presence of a catalyst. In a particular embodiment, the catalyst for oxidation is provided in a liquid form. In another particular embodiment, the catalyst for oxidation is provided in a solid form and may be in the form of particles in the bio-asphalt. After reading this specification, skilled artisans will be able to determine the particular conditions used for the oxidation. For the purposes of this specification, a bio-asphalt material is a partially oxidized vegetable or animal oil.

In a particular embodiment, the bio-asphalt material may be UEE™-brand bio-asphalt product from United Environment & Energy LLC of Horseheads, N.Y., USA. The UEE™-brand bio-asphalt product is believed to be a partially oxidized recycled waste cooking oil that includes fly ash with an oil to fly ash weight ratio between 1:0.5 and 1:3. U.S. Pat. No. 7,951,417 discloses a bio-based adhesive material for roofing shingles.

Referring to FIG. 1, the method can include mixing the partially oxidized bio-source material (bio-asphalt), a bitumen source material, and particles to form the roofing-grade asphalt mixture, at block 122. At least part of the bitumen source material can include a bitumen source material that, by itself, may have unacceptable characteristics for roofing-grade asphalt, which is referred to as "off-spec asphalt." The bio-asphalt may allow the off-spec asphalt to be used in making a roofing-grade asphalt mixture that still meets performance specifications and other desirable characteristics.

The off-spec bitumen source material may have a softening point that is too high and a penetration distance that is too low. In an embodiment, the off-spec asphalt bitumen source material can have a softening point of at least approximately 102° C. (215° F.) and a penetration distance no greater than approximately 20 dmm. In a particular embodiment, the softening point can be at least 105° C. (221° F.) or at least approximately 108° C. (226° F.). In another particular embodiment, the penetration distance may be no greater than approximately 17 dmm, no greater than approximately 14 dmm, or no greater than approximately 11 dmm. In a more particular embodiment, the off-spec bitumen source material has a softening point no greater than approximately 110° C. (230° F.) and a penetration distance of at least approximately 10 dmm.

In a further embodiment, another bitumen source material may be used in addition to or in place of the off-spec bitumen source material. The other bitumen source material may meet the specifications for roofing-grade asphalt. The bio-asphalt can be used to extend the other bitumen source material.

In an embodiment, the bio-asphalt and the bitumen source material may be combined after a desired softening point, penetration distance, viscosity, or another suitable characteristic is obtained as previously described. In a particular embodiment, the bio-asphalt and the bitumen source material can be combined and mixed using a mechanical mixer. The mixing may be performed as low shear mixing or as high shear mixing. The low shear mixing can be in the form of blending, and the high shear mixing can be in the form of milling or dispersing.

In an embodiment, mixing can be performed at a temperature of at least approximately 175° C. (346° F.), at least approximately 180° C. (355° F.), or at least approximately 185° C. (364° F.). In another embodiment, mixing can be performed at a temperature of no greater than approximately 235° C. (455° F.), no greater than approximately 230° C. (446° F.), or no greater than approximately 225 (437° F.). The combination of the bio-asphalt and bitumen source material, without any filler material as described below, is hereinafter referred to as a raw coating material.

The roofing-grade asphalt mixture has a total bitumen content corresponding to the content of the bio-asphalt and the bitumen source material. In an embodiment, the bio-asphalt is at least approximately 5 wt %, at least approximately 11 wt %, or at least approximately 15 wt % of the total bitumen content. In another embodiment, the bio-asphalt is no greater than approximately 50 wt %, no greater than approximately 40 wt %, or no greater than approximately 35 wt % of the total bitumen content.

If needed or desired, an additive chemical that can be used with the raw coating material. The additive chemical can include a process oil, a plasticizer, a polymer modifier, another suitable compound, or any combination thereof. The process oil can include a napthenic oil, an aliphatic oil, or an aromatic oil, another suitable oil, or any combination thereof. Another exemplary compound can include a styrene-butadiene-styrene, a styrene-ethylene-butylene-styrene, a styrene-isoprene-styrene, an acrylonitrile-butadiene-styrene, an atactic polypropylene, an isotactic polypropylene, a high density polyethylene, an ethylene-polypropylene copolymer, another suitable plasticizer or polymeric compound, or any combination thereof. A thermoplastic olefin can be formed using a metallocene catalyst and include a block copolymer polypropylene, a polyethylene-propylene rubber, or another suitable material.

In an embodiment, the additive chemical may be added to the raw coating material. In another embodiment, the additive chemical can be added to the bio-asphalt or the bitumen source material before the raw coating material is formed. Typically, the additive chemical is in the form of a solid or a liquid at room temperature. When an additive chemical is used, the raw coating material may include substantially none of the additive chemical, at least approximately 5 weight % of the additive chemical, or at least approximately 10 weight % of the additive chemical. In another embodiment, the raw coating material may include no greater than approximately 40 weight %, no greater than approximately 30 weight %, or no greater than approximately 25 weight % of the additive chemical.

Referring to block 122 of FIG. 1, the particles can be combined with the bio-asphalt, the bitumen source material, and if present, the additive chemical to form a roofing-grade asphalt mixture. Such particles can also be referred to as filler and can include limestone, talc, clay, coal fines, fly ash, gypsum, calcite, another suitable filler material, or any combination thereof. In an embodiment, the particles may be added to the raw coating material, and if present, the additive chemical. In another embodiment, the particles can be added to the bio-asphalt or the bitumen source material (after oxidation of the bitumen source material, if any oxidation is performed), before the raw coating material is formed. In a further embodiment, the particles can be added to the raw coating material, before the additive chemical, if present, is combined with the raw coating material. The combination of the raw coating material, the particles, and if present, the additive chemical is referred to as the filled coating material. The roofing-grade asphalt mixture can include the filled coating material. In a particular embodiment, the roofing-grade asphalt mixture is the filled coating material, and can include an additional material if needed or desired for a particular application.

In a shingle embodiment, the roofing-grade asphalt mixture can include at least approximately 45 weight % of particles, at least approximately 50 weight % of particles, or at least approximately 55 weight % of particles. In another shingle embodiment, the roofing-grade asphalt mixture may include no greater than approximately 80 weight % of particles, no greater than approximately 75 weight % of particles, or no greater than approximately 70 weight % of particles. In a membrane embodiment, the roofing-grade asphalt mixture may include at least approximately 5 weight % of particles, or at least approximately 10 weight % of particles. In another membrane embodiment, the roofing-grade asphalt mixture may include no greater than approximately 60 weight % of particles, no greater than approximately 50 weight % of particles, or no greater than approximately 40 weight % of particles.

The method can further include applying the roofing-grade asphalt mixture to a base structure, at block 142 of FIG. 1. The base material can include a fiberglass mat, a cellulose-based material, a polymer, or the like. In a particular embodiment, the cellulose-based material can include wood or paper. In another particular embodiment, the polymer can include a polyester. In a particular embodiment, the base material includes an open structure. The open structure can allow the roofing-grade asphalt mixture to flow within the open structure. The open structure can be in the form of pores, channels, interstitial openings within a matrix, another suitable void, or any combination thereof. Applying the roofing-grade asphalt mixture can be performed using any one or more methods. In an embodiment, the base material can be submerged into the roofing-grade asphalt mixture. In another embodiment (not illustrated), the open structure of the base material can be filled by spraying or coating the roofing-grade asphalt mixture onto the base material.

When the base material includes an open structure, the open structure may be partly or substantially completely filled with the roofing-grade asphalt mixture. The outermost portions of the base material may or may not be exposed after the roofing-grade asphalt mixture is applied. In an embodiment, the volume of the roofing-grade asphalt mixture is greater than a perimeter volume of the base material, and in another embodiment, the volume of the roofing-grade asphalt mixture is no greater than the perimeter volume of the base material. In a particular embodiment, a portion of a principal surface of the base material may be exposed; however, most of the structure or volume of the base material may be embedded within or saturated with the roofing-grade asphalt mixture.

A determination is made whether additional coating(s) are to be applied, at decision tree 144. If no additional coating is needed or desired, the method continues with the finishing operations. If one or more additional coatings are needed or desired, such additional coating(s) can be applied to combination of the base material and roofing-grade asphalt mixture. In an embodiment, an additional coating can include any of the previously described embodiments of the roofing-grade asphalt mixture. The additional coating and the roofing-grade asphalt mixture within the base material may have substantially the same composition or different compositions. In another embodiment, the additional coating can include a conventional roofing-grade asphalt composition. In a particular embodiment, the conventional roofing-grade asphalt composition may be substantially free of a partially oxidized bio-source material. In still another embodiment, the conventional roofing-grade asphalt composition may be applied to the base structure before the roofing-grade asphalt mixture, including the bio-asphalt, is applied to the base structure, and thus, the roofing-grade asphalt mixture may be present only in the additional coating(s). After the additional coating(s) are formed, the method continues with the finishing operations.

The method further includes finish processing of the roofing product, at block 162 of FIG. 1. Finishing can include one or more operations. In an embodiment, roofing granules can be applied to a surface of the coated base material. The roofing granules can be used for ultraviolet radiation protection, coloration, impact resistance, fire resistance, another suitable purpose, or any combination thereof. The roofing granules can include inert base particles that are durable, inert inorganic mineral particles, such as andesite, boehmite, coal slag, diabase, metabasalt, nephaline syenite, quartzite, rhyodacite, rhyolite, river gravel, mullite-containing granules, another suitable inert material, or any combination thereof.

The roofing granules can also include one or more surface coatings over the inert base particles. A surface coating can cover at least approximately 75% of the surface of the inert base particle, and may cover at least approximately 90% of the surface of the inert base particle. In a particular embodiment, the surface coating continuously covers the surface of the inert base particle, and such surface coating layer has a substantially uniform thickness. If more than one surface coating is used, a subsequent surface coating may cover an underlying surface coating to the extent described with respect to the inert base particles.

If more than one surface coating is used, a surface coating closer to the inert base particles can include a binder that can be inorganic or organic. An inorganic binder can include a silicate binder, a titanate binder, a zirconate binder, an aluminate binder, a phosphate binder, a silica binder, another suitable inorganic binder, or any combination thereof. An organic binder can include a polymeric compound. In a particular embodiment, an organic binder can include an acrylic latex, polyurethane, polyester, silicone, polyamide, or any combination thereof. One or more additional organic binders of the same or different composition can be used.

A surface coating can include a solar reflective material that helps to reflect at least some of the solar energy. For example, UV radiation can further polymerize or harden the asphalt within roofing product being fabricated. A solar reflective material can include titanium dioxide, zinc oxide, or the like. Alternatively, the solar reflective material can include a polymeric material. In an embodiment, a polymer can include a benzene-modified polymer (e.g., copolymer including a styrene and an acrylate), a fluoropolymer, or any combination thereof. Other solar reflective materials are described in U.S. Pat. No. 7,241,500 and U.S. Publication Nos. 2005/0072110 and 2008/0220167, all of which are incorporated by reference for their teachings of materials that are used to reflect radiation (e.g., UV, infrared, etc.) from the sun.

A surface coating can include an algaecide or another biocide to help reduce or delay the formation of algae or another organic growth. The algaecide or other biocide can include an organic or inorganic material. The algaecide or other biocide can include a triazine, a carbamate, an amide, an alcohol, a glycol, a thiazolin, a sulfate, a chloride, copper, a copper compound, zinc, a zinc compound, another suitable biocide, or any combination thereof. In a particular embodiment, the algaecide or other biocide can be included within a polymeric latex binder. The polymeric latex binder can include polyethylene, another polyolefin, an acid-containing polyolefin, ethylene vinyl acetate, an ethylene-alkyl acrylate copolymer, a polyvinylbutyral, polyamide, a fluoropolymer, an acrylic, a methacrylate, an acrylate, polyurethane, another suitable binder material, or any combination thereof. Alternatively, the binder may be a solvent-based surface coating, a radiation curable surface coating, or a two-part reactive surface coating. These alternative surface coatings may likewise include any of previously described polymeric materials. The same or different algaecide or other biocide can be used within different surface coatings. An algaecide or another biocide is not required to be present in every surface coating of the roofing granules. In another particular embodiment, the algaecide or other biocide can be an inorganic material that is included within an inorganic binder, for example, within an alkali metal silicate binder. An exemplary inorganic algaecide or other biocide can include a metal (by itself), a metal oxide, a metal salt, or any combination thereof. The metallic element used within the metal, metal oxide, or salt may include copper, zinc, silver, or the like. The metal salt can include a metal sulfate, a metal phosphate, or the like.

A surface coating can include a colorant or another material to provide a desired optical effect. The colorant or other material can include a metal oxide compound, such as titanium dioxide (white), zinc ferrite (yellow), red iron oxides, chrome oxide (green), and ultramarine (blue), silver oxide (black), zinc oxide (dark green), or the like. In another embodiment, the colorant or other material may not be a metal-oxide compound. For example, the colorant may include carbon black, zinc or aluminum flake, or a metal nitride.

An additional surface coating may be used for a different purpose not described herein. For example, the surface coating can include a different oxide, nitride, oxynitride, carbide, oxycarbide, or any combination thereof. After reading this specification, skilled artisans will be able to determine if an additional function or purpose is to be served by the roofing granules and whether an existing surface coating or material within a surface coating serves such a function or purpose or if an additional surface coating or an additional material within an existing surface coating would be needed or desired.

In addition to or in place of applying roofing granules, another finishing operation can be performed. For example, after the roofing granules are applied, another surface coating (not illustrated), similar to any single or combination of binders and surface coatings previously described with respect to the roofing granules, may be coated onto the roofing product after roofing granules have been applied. Such binder or surface coating may have a solar reflective property, an algaecide or other biocide, a pigment or another appearance modifier, or any combination thereof as previously described.

In another finishing operation, a parting agent can be applied to a surface of the roofing product. The parting agent helps to keep the roofing product from sticking to itself or sticking to other manufacturing equipment, such as the equipment used in the stamping or cutting operation. The parting agent can include particles of sand, talc, limestone, slag, another relatively inert material, or any combination thereof. If the roofing product includes roofing granules, the parting agent is applied to the surface of the roofing product opposite the roofing granules. After applying the roofing granules, parting agent, or both are applied, the roofing product can be processed during a stamping or cutting operation to achieve a desired shape for a finished roofing product. In particular, the finished roofing product is in the form of a roofing shingle.

In another embodiment, a membrane-type roofing product can be manufactured. The membrane-type roofing product has significant differences that are mostly seen with the finishing operations of the manufacturing process because the membrane-type roofing product is typically a self-adhesive product, although this is not a requirement. The finishing operations for a membrane-type roofing product can vary depending on the particular application.

In a particular embodiment, a principal surface of the membrane-type roofing product can be directly exposed to an outdoor environment. For this particular application, roofing granules, a surface coating, or both may be used. When the membrane-type roofing product is used as part of an underlayment or as a lower layer of a built-up roofing system, roofing granules may not be used. The membrane-type roofing product may be applied directly to a roof deck as a base sheet or an underlayment. In this particular application, an adhesive can be used to provide a good seal to help reduce the likelihood of water damage from ice dams. Accordingly, the finishing operation includes applying adhesive and a release sheet to the roofing product. The adhesive can include a tackifier, such as polyvinylbutyral, a pressure sensitive adhesive, another suitable compound, or any combination thereof. A pressure sensitive adhesive can include a silicone, a rubber, an acrylate, a bituminous adhesive, or the like. In a particular embodiment, a styrene-isoprene-styrene rubber composition can be used. A release sheet can be dispensed from a supply roll to the adhesive side to form the roofing product.

In an alternative embodiment (not illustrated), an adhesive modifier can be added to the roofing-grade asphalt that is first applied to the base structure, or to an asphalt coating applied to the surface of the roofing product that will be closest to a roofing structure. Thus, a separate adhesive application operation may be eliminated. In this particular embodiment, the release sheet would be applied to the surface having the adhesive-modified roofing-grade asphalt.

In still another embodiment, no finishing operation may be performed, only one or some, but not all, of the previously-described finishing operations may be performed, or another finishing operation may be performed in addition to or in place of another finishing operation as previously described. Alternatively, a take-up roll may be used instead of or before performing the stamping or cutting operation. After reading this specification, skilled artisans will be able to configure a manufacturing line for the particular roofing product being formed.

After reading this specification, skilled artisans will appreciate that many other roofing products can be made using the concepts as described herein. The particular materials, coatings, processes, and other parameters can be tailored for the roofing products that are needed or desired.

Figure 2:
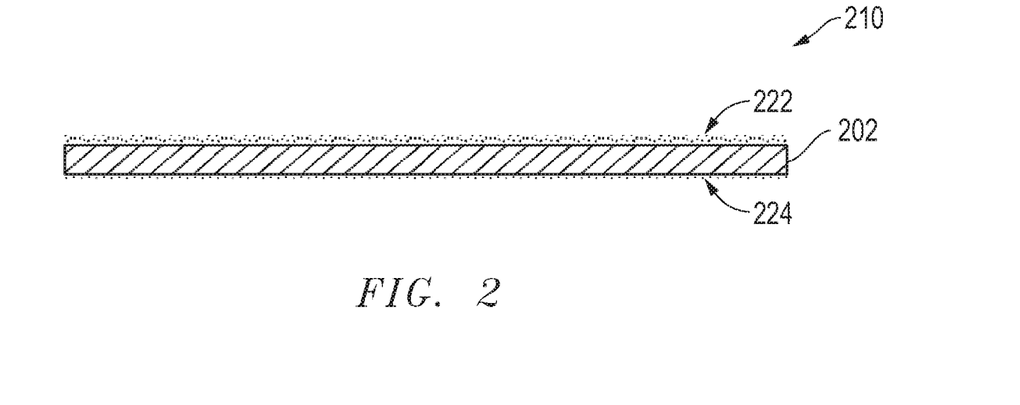
FIG. 2 includes an illustration of a cross-sectional view of a roofing product in accordance with an embodiment.

FIG. 2 includes an illustration of a cross-sectional view of the finished roofing product 210. The finished roofing product 210 includes a coated base material 202 that includes any of the roofing-grade asphalt mixtures as previously described. Roofing granules 222 are applied to a principal surface of the coated base material 202, and a parting agent 224 is applied to an opposite principal surface of the coated based material 202.

Figure 3:
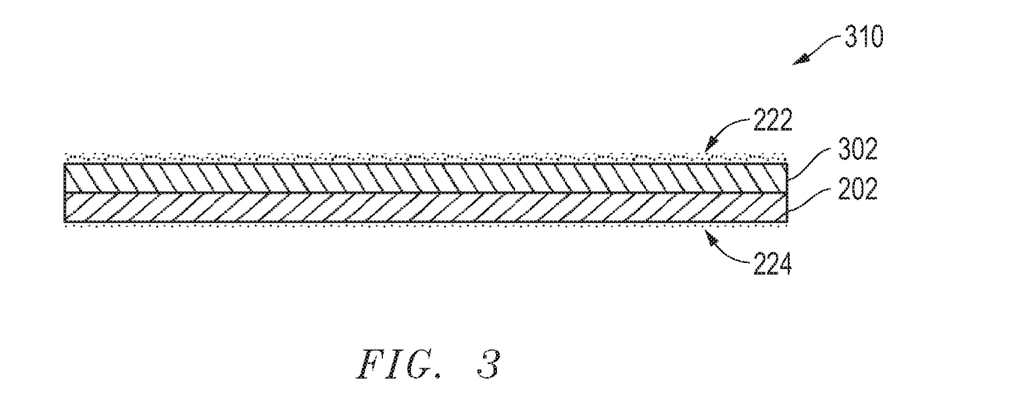
FIG. 3 includes an illustration of a cross-sectional view of a roofing product in accordance with another embodiment.

FIG. 3 includes an illustration of a cross-sectional view of the finished roofing product 310. The finished roofing product 310 includes the coated base material 202, roofing granules 222 and parting agent 224 as previously described with respect to the roofing product 210. Unlike the roofing product 210, the roofing product 310 includes a roofing-grade asphalt coating 302 that is disposed between the coated base material 202 and the roofing granules 222. The roofing-grade asphalt coating 302 can include any of the roofing-grade asphalt mixtures as previously described. Thus, the roofing-grade asphalt coating 302 may have substantially the same composition or a different composition as compared to the roofing-grade asphalt mixture within the coated base material 202.

In another embodiment, the roofing-grade asphalt coating 302 can include a conventional roofing-grade asphalt composition that is substantially free of a bio-source material. In a further embodiment, the asphalt compositions of the coated base material 202 and roofing-grade asphalt coating 302 can be reversed. In particular, the coated base material 202 can include a conventional roofing-grade asphalt composition, and the roofing-grade asphalt coating 302 can include the roofing-grade asphalt mixture that includes the bio-asphalt.

Figure 4:
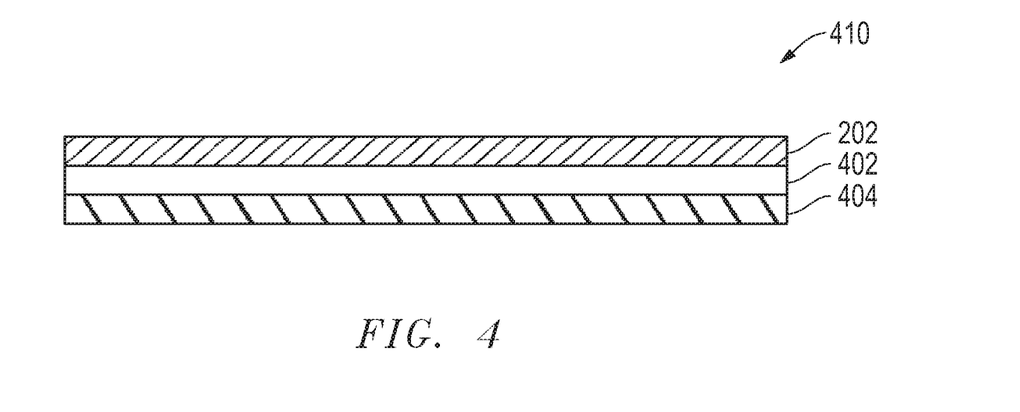
FIG. 4 includes an illustration of a cross-sectional view of a roofing product in accordance with a further embodiment.

FIG. 4 includes an illustration of a cross-sectional view of the finished roofing product 410. The finished roofing product 410 includes the coated base material 202 as previously described with respect to the roofing product 210. Unlike the roofing product 210 that has the parting agent 224, the roofing product 410 includes a layer of adhesive 402 and a release sheet 404. The roofing product 410 can be a roofing membrane. When the roofing product 410 is an underlayment, roofing granules may not be present. When the roofing product 410 has a principal surface that is exposed to outdoor conditions, roofing granules (not illustrated in FIG. 4) may be present along the principal surface opposite that of the layer of adhesive 402.

After reading this specification, skilled artisans will appreciate that FIGS. 2 to 4 illustrate only a few potential roofing products that can be formed with a roofing-grade asphalt mixture that includes a bio-asphalt. Other roofing products can be made without departing from the concepts as described herein.

When properly prepared, the roofing-grade asphalt mixture can include bio-asphalt and still meet the stringent requirements in order to produce roofing products that meet or exceed specifications. The bio-asphalt can be used to replace at least part of other bitumen source materials, and in particular petroleum-based asphalt. Further, the bio-asphalt can be used to help recover an off-spec bitumen source material that may otherwise have been discarded. A wider variety of bitumen source materials can be used. In addition, the cost of fabricating roofing products may not fluctuate as much, and supply concerns may be less, as bio-asphalt may be produced domestically.

The embodiments as described herein can be used to produce a roofing product that can include a bio-source material that may be new or used. In an embodiment, the bio-source can be used oils or other materials from other industries. For example, significant amounts of vegetable and animal oils are used or generated from restaurants. Such organic materials from biological sources may be limited value to others, as such materials may not be suitable for use in producing fuel-grade products, paving grade asphalt, or the like. Roofing-grade asphalt has different criteria, so materials can be recycled or used for other industries may be used to form roofing-grade asphalt. Thus, organic materials from biological sources, whether new or used, that may otherwise be of no significant commercial use in other industries may be used, recycled, processed, or the like for use in making bio-asphalt for a roofing-grade asphalt mixture.

Further, fabrication of roofing products is not significantly altered. The handling and application of the roofing-grade asphalt mixture and further fabrication of the roofing product can be substantially identical to that used for roofing products that include conventional roofing-grade asphalt. Thus, significantly different equipment and processes may not need to be used or integrated into an existing fabrication line.

Many different aspects and embodiments are possible. Some of those aspects and embodiments are described herein. After reading this specification, skilled artisans will appreciate that those aspects and embodiments are only illustrative and do not limit the scope of the present invention.

In a first aspect, a method of forming a roofing-grade asphalt mixture can include mixing a bio-asphalt including a partially oxidized bio-source material, a bitumen source material different from the bio-asphalt, and particles to form the roofing-grade asphalt mixture.

In an embodiment of the first aspect, the bitumen source material has a softening point of at least approximately 102° C. and a penetration distance no greater than approximately 20 dmm. In a particular embodiment, the softening point of the bitumen source material is at least approximately 105° C. or at least approximately 108° C. In another particular embodiment, the penetration distance of the bitumen source material is no greater than approximately 17 dmm, no greater than approximately 14 dmm, or no greater than 11 dmm. In another embodiment, the softening point of the bitumen source material is no greater than approximately 110° C., and the penetration distance of the bitumen source material is at least approximately 10 dmm.

In a further embodiment of the first aspect, the bitumen source material includes a petroleum-based asphalt. In another further embodiment, the roofing-grade asphalt mixture has a softening point of at least approximately 104° C., a penetration distance no greater than approximately 12 dmm, a viscosity of at least approximately 3000 cps at a temperature of 177° C., or any combination thereof. In another embodiment, the roofing-grade asphalt mixture has a softening point of at least approximately 121° C., a penetration distance no greater than approximately 15 dmm, a viscosity of at least approximately 5000 cps at a temperature of 177° C., or any combination thereof. In still a further embodiment, the bio-asphalt includes a partially oxidized vegetable oil, an animal oil, or any combination thereof. In still a further embodiment, the softening point of the roofing-grade asphalt mixture is at least approximately 104° C., at least approximately 106° C., or at least approximately 108° C. In yet another embodiment, the softening point of the roofing grade asphalt mixture is no greater than approximately 120° C., no greater than approximately 115° C., or no greater than approximately 112° C.

In another embodiment of the first aspect, the method further includes oxidizing the bitumen source material to raise a softening point before mixing the bio-asphalt, the bitumen source material, and the particles. In a further embodiment, the a softening point of a combination of the bio-asphalt and the bitumen source material is at least approximately 88° C., at least approximately 93° C., or at least approximately 104° C. In another further embodiment, the softening point of the combination of bio-asphalt and the bitumen source material is no greater than approximately 120° C., no greater than approximately 115° C., or no greater than approximately 112° C. In another embodiment, a penetration distance of a combination of the bio-asphalt and the bitumen source material is no greater than approximately 30 dmm, no greater than approximately 20 dmm, or no greater than approximately 15 dmm. In still another embodiment, at 177° C., a combination of the bio-asphalt and the bitumen source material has a viscosity of at least approximately 3500 cps, at least approximately 3700 cps, or at least approximately 3900 cps. In yet another embodiment, at 177° C., a combination of the bio-asphalt and the bitumen source material has a viscosity no greater than approximately 4500 cps, at least approximately 4400 cps, or at least approximately 4300 cps.

In still another embodiment of the first aspect, the roofing-grade asphalt mixture has a total bitumen content, wherein the bio-asphalt is at least approximately 5 wt %, at least approximately 11 wt %, or at least approximately 15 wt % of the total bitumen content. In yet another embodiment, the roofing-grade asphalt mixture has a total bitumen content, wherein the bio-asphalt is no greater than approximately 50 wt %, no greater than approximately 40 wt %, or no greater than approximately 35 wt % of the total bitumen content.

In a further embodiment of the first aspect, mixing is performed at a temperature of at least approximately 175° C., at least approximately 180° C., or at least approximately 185° C. In another further embodiment, mixing is performed at a temperature no greater than approximately 235° C., no greater than approximately 230° C., or no greater than approximately 225° C. In still a further embodiment, at 177° C., the roofing-grade asphalt mixture has a viscosity of at least approximately 3500 cps, at least approximately 3700 cps, or at least approximately 3900 cps. In yet a further embodiment, at 177° C., the roofing-grade asphalt mixture has a viscosity no greater than approximately 5000 cps, no greater than approximately 4600 cps, or no greater than approximately 4500 cps. In another embodiment, the particles include limestone, talc, clay, coal fines, fly ash, gypsum, calcite, or any combination thereof.

In a second aspect, a method of forming a roofing product can include mixing a bio-asphalt including a partially oxidized bio-source material, a bitumen source material different from the bio-asphalt, and particles to form a roofing-grade asphalt mixture; and applying the roofing-grade asphalt mixture to a base material.

In an embodiment of the second aspect, the bitumen source material has a softening point of at least approximately 102° C. and a penetration distance no greater than approximately 20 dmm. In a particular embodiment, the softening point of the bitumen source material is at least approximately 105° C. or at least approximately 108° C. In another particular embodiment, the penetration distance of the bitumen source material is no greater than approximately 17 dmm, no greater than approximately 14 dmm, or no greater than 11 dmm. In yet another embodiment, the softening point of the bitumen source material is no greater than approximately 110° C., and the penetration distance of the bitumen source material is at least approximately 10 dmm.

In a further embodiment of the second aspect, the bitumen source material includes a petroleum-based asphalt. In another further embodiment, the roofing-grade asphalt mixture has a softening point of at least approximately 104° C., a penetration distance no greater than approximately 12 dmm, a viscosity of at least approximately 3000 cps at a temperature of 177° C., or any combination thereof. In another embodiment, the roofing-grade asphalt mixture has a softening point of at least approximately 121° C., a penetration distance no greater than approximately 15 dmm, a viscosity of at least approximately 5000 cps at a temperature of 177° C., or any combination thereof. In still a further embodiment, the bio-asphalt includes a partially oxidized vegetable oil, an animal oil, or any combination thereof. In a particular embodiment, the softening point of the roofing-grade asphalt mixture is at least approximately 104° C., at least approximately 106° C., or at least approximately 108° C. In another particular embodiment, the softening point of the roofing-grade asphalt mixture is no greater than approximately 120° C., no greater than approximately 115° C., or no greater than approximately 112° C.

In another embodiment of the second aspect, the method further includes oxidizing the bitumen source material to raise a softening point before mixing the bio-asphalt, the bitumen source material, and the particles. In still another embodiment, the softening point of a combination of the bio-asphalt and the bitumen source material is at least approximately 88° C., at least approximately 90° C., or at least approximately 104° C. In yet another embodiment, a softening point of a combination of the bio-asphalt and the bitumen source material is no greater than approximately 120° C., no greater than approximately 115° C., or no greater than approximately 112° C. In a further embodiment, a penetration distance of a combination of the bio-asphalt and the bitumen source material is no greater than approximately 30 dmm, no greater than approximately 20 dmm, or no greater than approximately 15 dmm. In another further embodiment, at 177° C., a combination of the bio-asphalt and the bitumen source material has a viscosity of at least approximately 3500 cps, at least approximately 3700 cps, or at least approximately 3900 cps. In still a further embodiment, at 177° C., a combination of the bio-asphalt and the bitumen source material has a viscosity no greater than approximately 4500 cps, at least approximately 4400 cps, or at least approximately 4300 cps.

In a further embodiment of the second aspect, the roofing-grade asphalt mixture has a total bitumen content, wherein the bio-asphalt is at least approximately 5 wt %, at least approximately 11 wt %, or at least approximately 15 wt % of the total bitumen content. In another further embodiment, the roofing-grade asphalt mixture has a total bitumen content, wherein the bio-asphalt is no greater than approximately 50 wt %, no greater than approximately 40 wt %, or no greater than approximately 35 wt % of the total bitumen content. In still a further embodiment, mixing is performed at a temperature of at least approximately 175° C., at least approximately 180° C., or at least approximately 185° C. In yet a further embodiment, mixing is performed at a temperature no greater than approximately 235° C., no greater than approximately 230° C., or no greater than approximately 225° C.

In another embodiment of the second aspect, at 177° C., the roofing-grade asphalt mixture has a viscosity of at least approximately 3500 cps, at least approximately 3700 cps, or at least approximately 3900 cps. In still another embodiment, at 177° C., the roofing-grade asphalt mixture has a viscosity no greater than approximately 5000 cps, no greater than approximately 4600 cps, or no greater than approximately 4500 cps. In yet another embodiment, the particles includes limestone, talc, clay, coal fines, fly ash, gypsum, calcite, or any combination thereof. In another embodiment, the base material includes a fiberglass mat, a cellulose-based material, or a polymer. In a particular embodiment, the cellulose-based material includes wood or paper. In another particular embodiment, the polymer includes a polyester.

In a further embodiment of the second aspect, applying the roofing-grade asphalt mixture to the base material is performed such that the roofing-grade asphalt mixture substantially fills an open structure of the base material. In another further embodiment, applying the roofing-grade asphalt mixture to the base material is performed such that at least 50% of the roofing-grade asphalt material is outside of an open structure of the base material. In still a further embodiment, the roofing product includes a roofing shingle, and a particle content is less than 80 weight % of the roofing-grade asphalt mixture. In a particular embodiment, the particle content includes approximately 64 weight % to approximately 70 weight % of the roofing-grade asphalt mixture. In yet a further embodiment, the roofing product includes a membrane-type roofing product, and a particle content is less than 60 weight % of the roofing-grade asphalt mixture.

In another embodiment of the second aspect, mixing includes mixing the bio-asphalt, the bitumen source material, the particles, and a plasticizer. In still another embodiment, the method further includes applying roofing granules to an exposed surface of the roofing product after applying the roofing-grade asphalt mixture to the base material. In yet another embodiment, the method further includes applying a release sheet to an exposed surface of the roofing product after applying the roofing-grade asphalt mixture to the base material. In a further embodiment, the method is performed such that the roofing product is in a form of a roofing shingle. In another further embodiment, the method is performed such that the roofing product is in a form of a roofing membrane.

In a third aspect, a roofing product can include a base material and a roofing-grade asphalt mixture. The roofing-grade asphalt mixture can include a bio-asphalt including a partially oxidized bio-source material, a bitumen source material different from the bio-asphalt, and particles.

In an embodiment of the third aspect, the bitumen source material has a softening point of at least approximately 102° C. and a penetration distance no greater than approximately 20 dmm. In a particular embodiment, the softening point of the bitumen source material is at least approximately 105° C. or at least approximately 108° C. In another particular embodiment, the penetration distance of the bitumen source material is no greater than approximately 17 dmm, no greater than approximately 14 dmm, or no greater than 11 dmm. In yet another embodiment, the softening point of the bitumen source material is no greater than approximately 110° C., and the penetration distance of the bitumen source material is at least approximately 10 dmm.

In a further embodiment of the third aspect, the bitumen source material includes a petroleum-based asphalt. In another further embodiment, the roofing-grade asphalt mixture has a softening point of at least approximately 104° C., a penetration distance no greater than approximately 12 dmm, a viscosity of at least approximately 3000 cps at a temperature of 177° C., or any combination thereof. In a further embodiment, the roofing-grade asphalt mixture has a softening point of at least approximately 121° C., a penetration distance no greater than approximately 15 dmm, a viscosity of at least approximately 5000 cps at a temperature of 177° C., or any combination thereof. In still another embodiment, the bio-asphalt includes a partially oxidized vegetable oil, an animal oil, or any combination thereof. In yet another embodiment, a softening point of the roofing-grade asphalt mixture is at least approximately 104° C., at least approximately 106° C., or at least approximately 108° C. In a further embodiment, a softening point of the roofing-grade asphalt is no greater than approximately 120° C., no greater than approximately 115° C., or no greater than approximately 112° C.

In another further embodiment of the third aspect, the roofing-grade asphalt mixture has a total bitumen content, wherein the bio-asphalt is at least approximately 5 wt %, at least approximately 11 wt %, or at least approximately 15 wt % of the total bitumen content. In still a further embodiment, the roofing-grade asphalt mixture has a total bitumen content, wherein the bio-asphalt is no greater than approximately 50 wt %, no greater than approximately 40 wt %, or no greater than approximately 35 wt % of the total bitumen content. In yet a further embodiment, at 177° C., the roofing-grade asphalt mixture has a viscosity of at least approximately 3500 cps, at least approximately 3700 cps, or at least approximately 3900 cps. In another embodiment, at 177° C., the roofing-grade asphalt mixture has a viscosity no greater than approximately 5000 cps, no greater than approximately 4600 cps, or no greater than approximately 4500 cps.

In still another embodiment of the third aspect, the particles include limestone, talc, clay, coal fines, fly ash, gypsum, calcite, or any combination thereof. In yet another embodiment, the bitumen source material includes petroleum-based asphalt. In a further embodiment, the base material includes a fiberglass mat, a cellulose-based material, or a polymer. In a particular embodiment, the cellulose-based material includes wood or paper. In another particular embodiment, the polymer includes a polyester. In another further embodiment, the roofing-grade asphalt mixture substantially fills an open structure of the base material. In still a further embodiment, at least 50% of the roofing-grade asphalt material is outside of an open structure of the base material.

In another embodiment of the third aspect, the roofing product includes a roofing shingle, and a particle content is less than 80 weight % of the roofing-grade asphalt mixture. In a particular embodiment, the particle content includes approximately 64 weight % to approximately 70 weight % of the roofing-grade asphalt mixture. In still another embodiment, the roofing product includes a membrane-type roofing product, and a particle content is less than 60 weight % of the roofing-grade asphalt mixture. In a further embodiment, the roofing-grade asphalt mixture further includes a plasticizer. In another further embodiment, the roofing product further includes roofing granules along a surface of the roofing product. In still a further embodiment, the roofing product further includes a release sheet along a surface of the roofing product. In yet a further embodiment, the roofing product is in a form of a roofing shingle or a roofing membrane.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A method of forming a roofing-grade asphalt mixture consisting of:
   mixing (i) a bio-asphalt consisting of a bio-source material with: (ii) a bitumen source material, (iii) particles, and (iv) an optional additive chemical selected from the group consisting of a process oil, a plasticizer, a polymer modifier, or combination thereof to form the roofing-grade asphalt mixture, wherein the bio-source material consists of a partially oxidized bio-source material, wherein the bitumen source material has a penetration distance of no greater than approximately 14 dmm, wherein the bitumen source material is different from the bio-source material and the bitumen source material consists of petroleum-based asphalt, wherein the bio-source material is at least approximately 5 wt % of a total bitumen content, wherein the roofing-grade asphalt mixture has a softening point of at least approximately 104° C., a viscosity of at least approximately 3000 centipoise at a temperature of 177° C., and a penetration distance of not greater than about 30 dmm.

2. The method of claim 1, wherein the bitumen source material has a softening point of at least approximately 102° C.

3. The method of claim 1, wherein the bio-source material consists of a partially oxidized vegetable oil, a partially oxidized animal oil, or any combination thereof.

4. The method of claim 1, wherein the particles consist of limestone, talc, clay, coal fines, fly ash, gypsum, calcite, or any combination thereof.

5. A method of forming a roofing product consisting of:
mixing (i) a bio-asphalt consisting of a bio-source material with: (ii) a bitumen source material, (iii) particles, and (iv) an optional additive chemical selected from the group consisting of a process oil, a plasticizer, a polymer modifier, or combination thereof to form a roof-grade asphalt mixture, wherein the bio-source material consists of a partially oxidized bio-source material, wherein the bitumen source material has a penetration distance of no greater than approximately 14 dmm, wherein the bitumen source material is different from the bio-source material and the bitumen source material consists of petroleum-based asphalt, wherein the bio-source material is at least approximately 5 wt % of a total bitumen content; and applying the roofing-grade asphalt mixture to a base material, wherein the roofing-grade asphalt mixture has a softening point of at least approximately 104° C., a viscosity of at least approximately 3000 centipoise at a temperature of 177° C., and a penetration distance of not greater than about 30 dmm.

6. The method of claim 5, wherein the bitumen source material has a softening point of at least approximately 102° C.

7. The method of claim 5, wherein the bio-source material consists of a partially oxidized vegetable oil, a partially oxidized animal oil, or any combination thereof.

8. The method of claim 5, wherein the base material consists of a fiberglass mat, a cellulose-based material, or a polymer.

9. The method of claim 5, wherein the method is performed such that the roofing product is in a form of a roofing shingle.

10. The method of claim 5, wherein the method is performed such that the roofing product is in a form of a roofing membrane.

\* \* \* \* \*